(12) United States Patent
Lahti et al.

(10) Patent No.: US 9,559,434 B2
(45) Date of Patent: Jan. 31, 2017

(54) METHOD FOR CLOSED-LOOP TUNER IN A RECEIVER ANTENNA

(71) Applicants: Saku Lahti, Tampere (FI); Jukka Leppanen, Pirkkala (FI); Mikko S. Komulainen, Tampere (FI)

(72) Inventors: Saku Lahti, Tampere (FI); Jukka Leppanen, Pirkkala (FI); Mikko S. Komulainen, Tampere (FI)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/569,116

(22) Filed: Dec. 12, 2014

(65) Prior Publication Data

US 2016/0172768 A1    Jun. 16, 2016

(51) Int. Cl.
  *H04B 1/40*   (2015.01)
  *H01Q 23/00*  (2006.01)
  *H04B 1/18*   (2006.01)
  *H04B 17/21*  (2015.01)

(52) U.S. Cl.
  CPC ............ *H01Q 23/00* (2013.01); *H04B 1/18* (2013.01); *H04B 17/21* (2015.01)

(58) Field of Classification Search
  CPC ................................ H01Q 23/00; H04B 17/21
  USPC ................. 455/77, 83, 85, 86, 351, 500
  See application file for complete search history.

(56) References Cited

U.S. PATENT DOCUMENTS

| | | | | |
|---|---|---|---|---|
| 7,805,122 B2 * | 9/2010 | Lerner | .................... | H03B 21/00 327/156 |
| 8,300,680 B2 * | 10/2012 | Pals | ......................... | H04B 1/28 341/155 |
| 8,396,003 B2 * | 3/2013 | Leinonen | ............. | H04B 1/3805 370/252 |
| 8,437,385 B1 * | 5/2013 | Dark | ........................ | H04L 1/248 375/224 |
| 8,630,211 B2 * | 1/2014 | Gainey | ................... | H04B 1/525 370/279 |
| 8,761,698 B2 * | 6/2014 | Langer | .................. | H04B 1/0458 455/107 |
| 9,124,316 B2 * | 9/2015 | Langer | .................. | H04B 1/0458 |
| 9,219,596 B2 * | 12/2015 | Mikhemar | ............ | H04L 5/1461 |
| 2004/0203548 A1 * | 10/2004 | Kim | ........................ | H04B 1/525 455/226.1 |
| 2008/0231368 A1 * | 9/2008 | Suzaki | ....................... | H03F 1/30 330/277 |
| 2010/0304684 A1 * | 12/2010 | Duron | .................... | G01R 27/04 455/67.11 |
| 2011/0086600 A1 * | 4/2011 | Muhammad | ......... | H04B 1/0458 455/120 |
| 2012/0264380 A1 * | 10/2012 | Cobley | .................. | H03F 1/0222 455/77 |
| 2013/0027129 A1 * | 1/2013 | Langer | .................. | H04B 1/0458 330/127 |
| 2013/0059546 A1 * | 3/2013 | Lum | .................... | H04B 1/0475 455/73 |

(Continued)

*Primary Examiner* — Marceau Milford
(74) *Attorney, Agent, or Firm* — Forefront IP Lawgroup of Christie and Rivera, PLLC

(57) ABSTRACT

Described herein are architectures, platforms and methods for implementing a closed-loop tuner in a receiver circuitry of a portable device. For example, the closed-loop tuner is based upon a configured or an inherent local oscillator (LO) leakage power in the receiver circuitry of the portable device.

17 Claims, 5 Drawing Sheets

(56) References Cited

U.S. PATENT DOCUMENTS

2014/0220908 A1* 8/2014 Loh ..................... H04B 1/525
  455/78

* cited by examiner

METHOD FOR CLOSED-LOOP TUNER IN A RECEIVER ANTENNA

BACKGROUND

An increasing number of wireless communication standards as applied to a portable device and a trend towards ever smaller, slimmer and lighter portable devices may cause major design challenges for antenna or antennas. The antenna represents a category of components that may fundamentally differ from other components in the portable device. For example, the antenna may be configured to efficiently radiate in free space, whereas the other components are more or less isolated from their surroundings.

Actively tuned antennas may be seen as a key technology that enables antenna miniaturization in future mobile communication devices. For example, the actively tuned antennas may support multiple radio frequency (RF) bands and further supports performance optimization. Performance optimization may include antenna impedance measurements and adjustments for purposes of obtaining a matched impedance in a receiver circuitry of the portable device. The impedance matching, for example, may facilitate maximum power transfer between the antenna and the receiver circuitry of the portable device.

BRIEF DESCRIPTION OF THE DRAWINGS

The detailed description is described with reference to accompanying figures. In the figures, the left-most digit(s) of a reference number identifies the figure in which the reference number first appears. The same numbers are used throughout the drawings to reference like features and components.

DETAILED DESCRIPTION

Described herein are architectures, platforms and methods for implementing a closed-loop tuner in a receiver circuitry of a portable device. For example, the receiver circuitry of the portable device includes a local oscillator (LO) that facilitates demodulation of a received RF signal. In this example, the LO is configured to provide or generate a pre-defined level or amount of LO leakage power. Similarly, the same principle can also be applied using the LO leakage power as it inherently appears without the pre-configuration as mentioned above.

Based on the generated LO leakage power, an antenna impedance measurement is performed to determine whether mismatched antenna impedance is present at an antenna of the portable device. In other words, the pre-configured LO leakage power or the inherent LO leakage power in the receiver circuitry may be utilized as a test signal for the measurement and adjustment of the antenna impedance. Thereafter, tuning of the antenna is performed in response to a determined out-of-tune antenna or mismatched antenna impedance.

Figure 1:
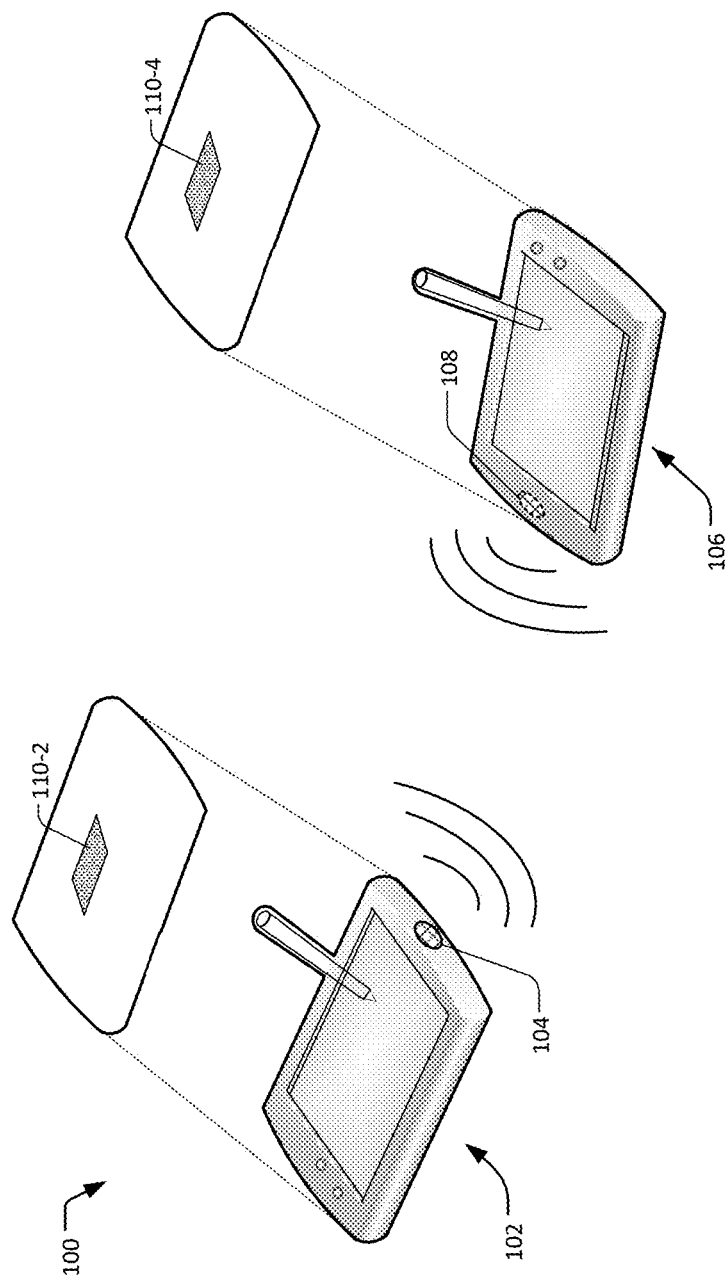
FIG. 1 is an example scenario that utilizes a closed-loop tuning using a LO leakage power in a receiver circuitry or system of a portable device.

FIG. 1 is an example scenario 100 that utilizes closed-loop tuning using a LO leakage power in a receiver circuitry or system of a portable device. The scenario 100 shows a portable device 102 with an antenna 104, and another portable device 106 with an antenna 108. Furthermore, the scenario 100 illustrates a tuner circuitry 110 for each portable devices 102 and 106 for purposes of illustrating implementations described herein.

The portable devices 102 or 106 may include, but are not limited to, a tablet computer, a netbook, a notebook computer, a laptop computer, mobile phone, a cellular phone, a smartphone, a personal digital assistant, a multimedia playback device, a digital music player, a digital video player, a navigational device, a digital camera, and the like.

The portable device 102, for example, may communicate with the other portable device 106 in a network environment. The network environment, for example, includes a cellular network configured to facilitate communications between the portable devices 102 and 106 using a base station (not shown). During this cellular network communications (i.e., active receiver circuitry), closed-loop tuning of the antennas 104 or 108, for example, may be implemented by the receiving portable device 102 through its tuner circuitry 110-2. The closed-loop tuning, in this example, may utilize a LO leakage power from a LO (not shown) that may be located within or outside of the receiver circuitry or system of the portable device 102. The closed-loop tuning may facilitate adjustment of the antenna 104 to obtain a matched antenna impedance for maximum power transfer. The maximum power transfer, for example, is utilized in receiving of data signal.

In another implementation, the receiver circuitry or system of the receiving portable device 102 is in inactive mode. In this implementation, the tuner circuitry 110-2 may perform the tuning adjustment based on the same LO leakage power from the LO. For example, a feedback loop (not shown) is implemented to measure a forward power and a reflected power based upon the LO leakage power. In this example, the closed-loop tuning may be implemented even though the receiver circuitry or system is not in the active mode.

In an implementation, the tuner circuitry 110 may set the LO leakage power to a pre-defined level. For example, the LO in the receiver circuitry of the portable device 102 is configured by the tuner circuitry 110 to provide a particular amount of LO leakage power. In this example, the particular amount of the LO leakage power may be utilized for measuring an antenna impedance and furthermore, the LO leakage power may be used as basis for subsequent tuning adjustment of the antenna (e.g., antenna 104 or 108).

In another implementation, the LO leakage is not pre-configured. To this end, the measurement of the antenna impedance and the subsequent tuning adjustment of the antenna may be based on actual measurements of the LO leakage power that is currently running in the receiver circuitry or system of the portable devices 102 or 106.

The tuner circuitry 110 may be located near an antenna feed-line, or in close proximity of the antenna as illustrated in the FIG. 1. In another scenario, the tuner circuitry 110 may be disposed between two or more different parts of an antenna structure that includes multiple parts or components. Furthermore, the tuner circuitry 110 may be used for adjusting two or more antennas within the same portable device. For example, the tuner circuitry 110 may include passive and/or active electrical components suitable for adjusting antenna impedance or other meaningful property of the antenna 104 or 108.

Although the example scenario 100 illustrates in a limited manner basic components of wireless communications between the portable devices 102 and 106, other components such as battery, one or more processors, SIM card, etc. were not described in order to simplify the embodiments described herein. Furthermore, the adjustment the LO leakage power may be derived or facilitated by adjustment of components, other than the LO, within the portable device.

Figure 2A:
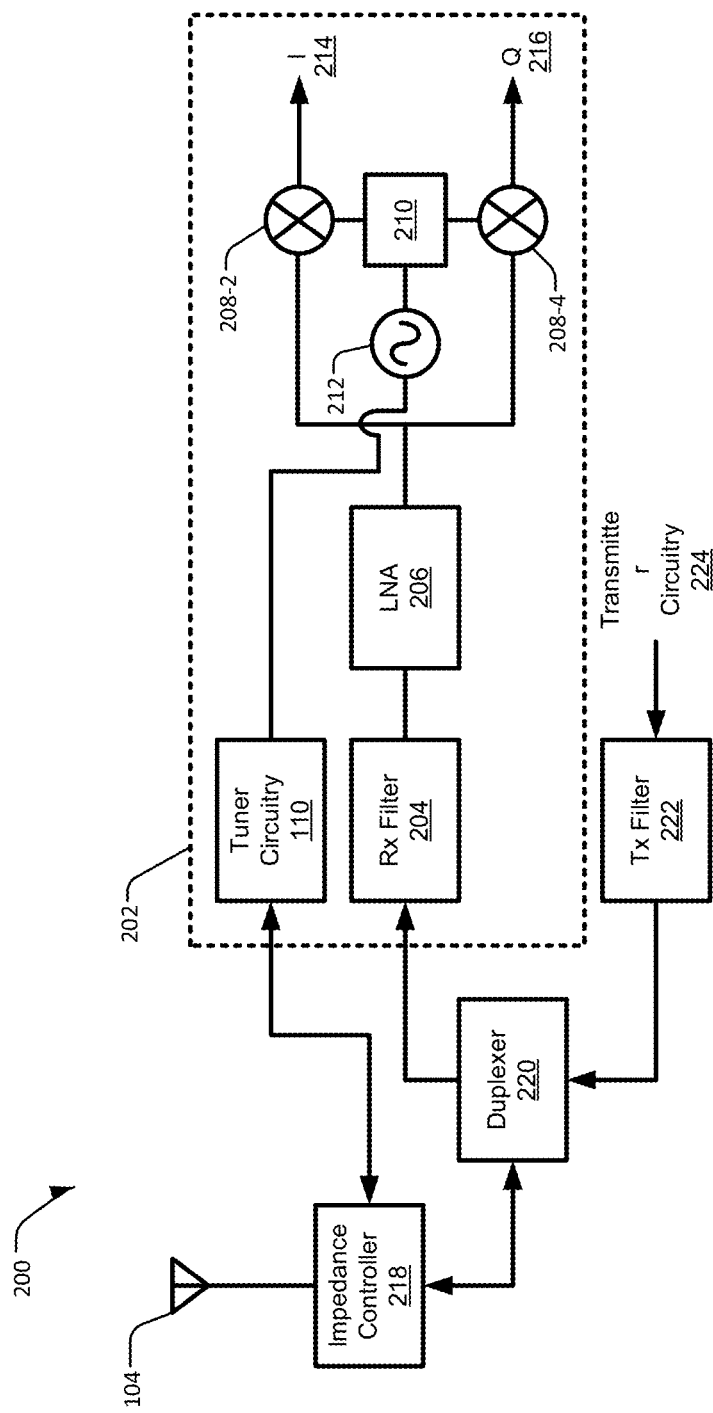
FIG. 2A is an example apparatus to implement a closed-loop tuning using a LO leakage power in a receiver circuitry of a portable device.

FIG. 2A shows an example apparatus 200 that is configured to implement a closed-loop tuner (i.e., based on LO leakage power) in the portable device. As shown, the apparatus 200 includes a receiver circuitry 202 that further includes the tuner circuitry 110, a receive filter 204, a low-noise amplifier (LNA) 206, mixers 208, a phase shifter 210, a LO 212, an in-phase (I) signal 214, and a quadrature (Q) signal 216. Furthermore, the apparatus 200 shows an impedance controller 218, a duplexer 220, a transmit filter 222 and a transmitter circuitry 224. As described in present implementations herein, the closed-loop tuner is implemented during a receive-only system i.e., transmit path is not available.

As described herein, the tuner circuitry 110 may include one or more processors, hardware, software, firmware, or a combination thereof in implementing the closed-loop tuning that is based upon the LO leakage power. For example, the tuner circuitry 110 may configure the LO 212 to provide a pre-defined level of LO leakage power. In this example, the tuner circuitry 110 generates a control signal that changes a setting of the LO 212 to provide the pre-defined level of LO leakage power. The setting, for example, includes adjustment of the I and Q components (i.e., mixers 208) to provide a particular phase, amplitude, gain, and the like. In this example, changes in the I and Q branches of the receiver circuitry 202 may produce changes in the LO leakage power.

In an implementation, the tuner circuitry 110 balances or configures the mixers 208 in order to control the level of the LO leakage power. In this implementation, the tuner circuitry 110 facilitates adjustments of the mixers 208 in order to provide the balanced I and Q signals. The balanced I and Q signals, for example, may correspond to a particular value of the LO leakage power that is generated by the LO 212.

By measuring the I signal 214 and Q signal 216 simultaneously, a direct conversion receiver may derive the phase and amplitude of the original transmitted signal.

With the configured LO leakage power that is generated by the LO 212, the tuner circuitry 110 may facilitate antenna impedance measurements of the antenna 104. For example, the tuner circuitry 110, using a directional coupler (not shown), measures the forward power level and the reflected power level based upon the pre-defined value of the LO leakage power. In this example, a matched or mismatched antenna impedance may provide the basis for the current status or tuning of the antenna 104.

For example, the mismatch antenna impedance may include a substantial variance between the measured forward power level and the reflected power level. In this example, the tuner circuitry 110 may generate another control signal that is received by the impedance controller 218 in order to change an antenna impedance setting of the antenna 104. The changing of the antenna impedance setting may include adjusting, for example an impedance matching circuitry (not shown) to obtain a matched antenna impedance. In another example where there is no variance between the measured forward and reflected power levels (i.e., matched antenna impedance), no adjustment of the antenna impedance setting is implemented until the next period or cycle where the above measurements is again performed.

In a case where the LO leakage power is not pre-configured to a particular pre-defined value, the tuner circuitry 110 may measure, for example, the present LO leakage power that may be produced by the LOs 212. In this example, the measured LO leakage power is utilized as a basis for measuring the antenna impedance as described above.

With continuing reference to FIG. 2A, the RF signal received through the antenna 104 may pass through the duplexer 220 which allows bi-directional communication over a single path. The bi-directional communication may allow transmission of the RF signals by the transmitter circuitry 224, or the receiving of the RF signals by the receiver circuitry 202.

At the receiver circuitry 202, the received RF signals can be filtered by the Rx filter 204. The filtered RF signals are subsequently amplified by the LNA 206. At this stage, the amplified received RF signals may undergo, for example, a quadrature sampling detector circuitry that includes the phase shifter 210, the LO 212, and the mixers 218.

In an implementation, the closed-loop tuning based on the LO leakage power may be performed after every time period. That is, on a particular frequency to maintain the matched antenna impedance setting of the antenna 104.

Although the example apparatus 200 illustrates in a limited manner basic components of the receiver of the portable device, other components such as battery, one or more memories, SIM card, etc. were not described in order to simplify the embodiments described herein. Furthermore, the location of the LO 212 is not limited within the receiver circuitry 202. Other LO leakage power from other components may be considered as well during the implementation of the closed-loop tuning as described herein.

Figure 2B:
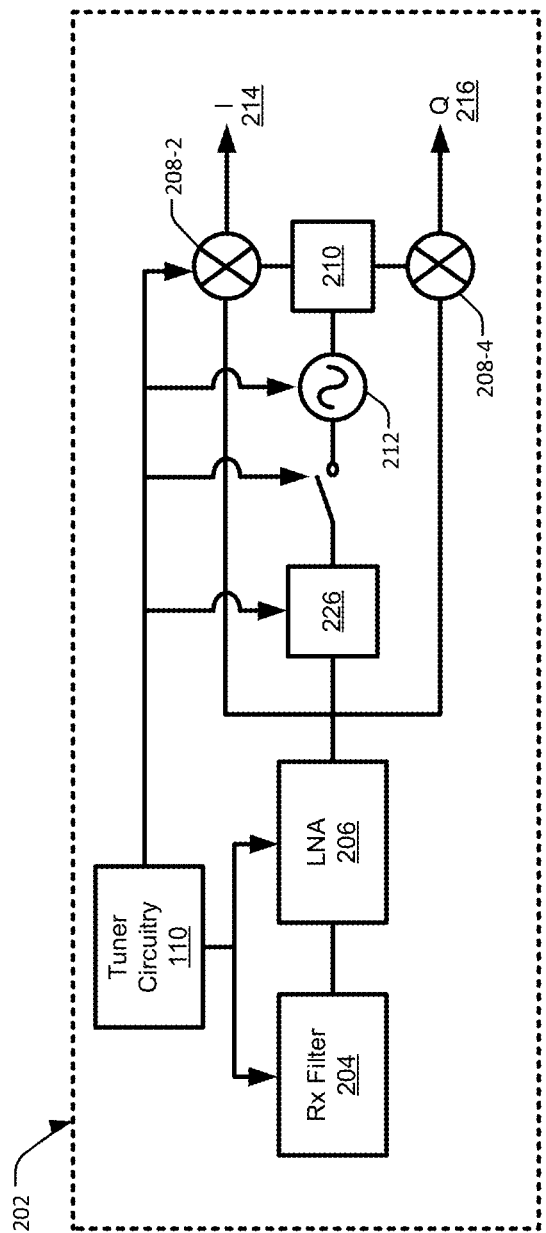
FIG. 2B is an example implementation of a receiver circuitry of a portable device to implement a closed-loop tuning using a LO leakage power.

FIG. 2B illustrates an example implementation of the receiver circuitry 202 of the portable device as described in present implementations herein. As shown, the tuner circuitry 110 may be configured to control one or more parameters or blocks at the receiver circuitry 202. Other components as shown in FIG. 2A were not included in FIG. 2B to simplify the embodiments described herein.

In an implementation, the generation, adjustment or configuration of the LO leakage power may not be limited to the control and adjustment of the mixers 208 and/or the LO 212 as described above. For example, as shown in FIG. 2B, a controlled attenuator 226, which is directly controlled by the tuner circuitry 110, may be configured to control the amount of LO leakage power as well. In this example, the controlled attenuator 226 may implement an algorithm to perform adjustment of the LO leakage. In addition, the arrangement may also include simultaneous adjustment of the LNA gain, and other parameters in the receiver circuitry 202. In these additional examples, or in combination with the adjustment of the mixers 208, the LO leakage power may be adjusted.

Figure 3:
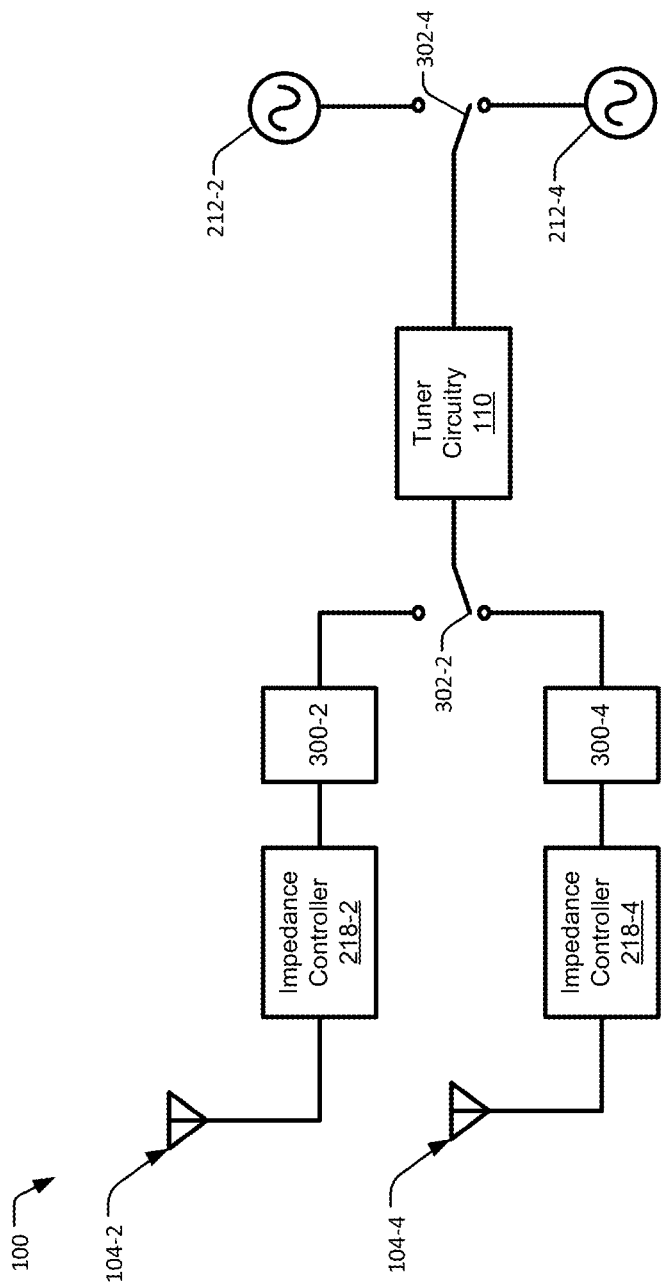
FIG. 3 is an implementation of a closed-loop tuning in multiple antennas of a portable device.

FIG. 3 shows an implementation of the closed-loop tuning in multiple antennas within the portable device. As shown, FIG. 3 includes the antennas 104-2 and 104-4, their respective impedance controllers 218-2 and 218-4, a first directional coupler 300-2 that is coupled to the antenna 104-2, a second directional coupler 300-4 that is coupled to the antenna 104-4, switches 302-2 and 302-4, the tuner circuitry 110, and the LOs 212-2 and 212-4 for the antennas 104-2 and 104-4, respectively.

As an example of present implementations herein, the portable device 102 may utilize multiple antennas 104 during wireless communications. In this example, the switch 302 may be utilized by the tuner circuitry 110 to adjust the antenna impedances of the antennas 104-2 and 104-4.

For example, the tuner circuitry 110 generates the control signal that is received by the LO 212-2. In this example, the LO 212-2 produces a particular pre-defined amount of LO leakage power that is used for measuring antenna impedance of the antenna 104-2.

The antenna impedance measurement, for example, utilizes the first directional coupler 300-2 for measuring the forward power level and the reflected power level based on the pre-defined amount of LO leakage power. Thereafter, the tuner circuitry 110 may determine the current tuning of the antenna 104-2 and generates another control signal that is received by the impedance controller 218-2.

The impedance controller 218-2, for example, may adjust the setting of the antenna impedance in a case where the tuner circuitry 110 determines a mismatched antenna impedance. The setting adjustment, for example, provides transfer of maximum power between the antenna 104-2 and the receiver circuitry of the portable device 102.

When the switches 302-2 and 302-4 toggle to the antenna 104-4, which may be a receive-only antenna, the same method as described above is implemented to obtain the closed-loop tuning of the antenna 104-4.

In another implementation, the LO leakage power is not pre-configured to a particular pre-defined value. That is, the tuner circuitry 110 may measure, for example, during inactive state the present LO leakage power that may be produced by the LOs 212. In this example, the measured LO leakage power is utilized as a basis for measuring the antenna impedance as described above.

Figure 4:
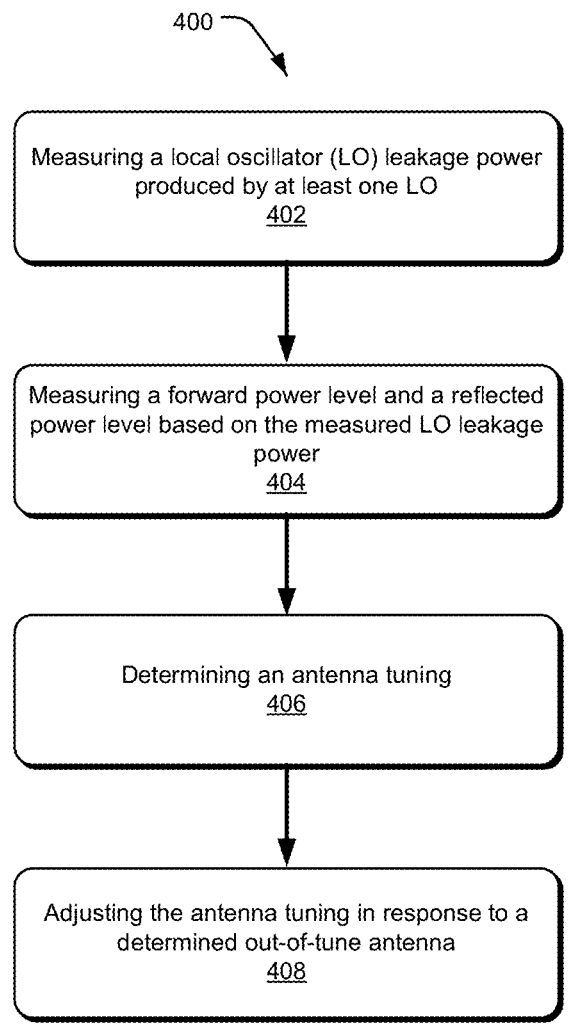
FIG. 4 is an example process chart illustrating an example method for a closed-loop tuner in a receiver circuitry of a portable device.

FIG. 4 shows an example process chart 400 illustrating an example method for implementing a closed-loop tuner in a receiver circuitry of a portable device. For example, the closed-loop tuner is based on a configured LO leakage power in the receiver circuitry. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 402, measuring a LO leakage power produced by at least one LO is performed. For example, one or more LOs 212 may be disposed within or outside of the receiver circuitry 202. During an inactive state, for example, the tuner circuitry 110 may measure the amount of the LO leakage power that were produced by the at least one LO 212. The measured LO leakage power, for example, may include the LO leakage power between the antenna 104 and the receiver circuitry 202.

In another implementation, the LO leakage power may be configured to a pre-defined value or level. For example, the LO 212 of the receiver circuitry 202 is configured to produce the pre-defined level of LO leakage power. In this example, the tuner circuitry 110 controls the LO 212 by sending control signals to adjust an in-phase signal component (I) and quadrature signal (Q) component branches of the receiver circuitry 202. The adjustment, for example, may further include the varying of the phase, amplitude, gain, and other setting of components or blocks in the receiver circuitry 202 in order to ultimately generate the pre-defined level of the LO leakage power.

In an implementation, the pre-defined level of LO leakage power may not exceed a specification limit of the receiver circuitry 202. For example, the specification limit may include the amount of LO leakage power that may not interrupt the regular operation of the receiver circuitry 202. In another example, the specification limit may include the amount of LO leakage power that is allowed in wireless communications regulations such as the 3GPP specification limit for LO leakage (i.e., −57 dBm for freq<1 GHz and −47 dBm for freq>1 GHz, 2G, 3G and LTE).

In an implementation, the receiver circuitry 202 of the portable device 102 may be in active state or in inactive state. In active state, the receiver circuitry 202 receives and demodulates the RF signal. In this active state, different measurements of antenna impedance may be obtained as compared to an inactive receiver circuitry 202. For example, power measurements to obtain the antenna impedance of the active receiver circuitry 202 may have greater values as compared to the power measurements to obtain the antenna impedance of the inactive receiver circuitry 202. The reason being, another LO leakage power may be generated from another LO such as the LO used for transmission.

At block 404, measuring a forward power level and a reflected power level based on the measured LO leakage power is performed. For example, the tuner circuitry 110 is configured to measure the antenna impedance of the antenna 104. In this example, the tuner circuitry 110 measures the forward power level and the reflected power level based upon the measured value of the LO leakage power.

In a case where the LO leakage power includes the pre-defined level or value, the measurement of the forward power level and the reflected power level may be based upon the pre-defined value of the LO leakage power.

In an implementation, the tuner circuitry 110 may utilize a single-pole-multiple-throw switch in order to measure difference antenna impedances of different antennas. In this implementation, the directional coupler 300, for example, may be utilized to measure the respective forwarded and reflected power levels of the antennas.

At block 406, determining an antenna tuning is performed. For example, the tuner circuitry 110 determines a current tuning of the antenna 104 based upon the measured antenna impedance. In this example, an out-of-tune antenna 104 may include a mismatched antenna impedance such as a substantial variance between the forward power level and the reflected power level. Thus, the antenna may be considered to be out-of-tune antenna.

At block 408, adjusting the antenna tuning in response to a determined out-of-tune antenna is performed. For example, the tuner circuitry 110 controls the impedance controller 218 to adjust the antenna impedance in a case of mismatched antenna impedance. In this example, the adjustment of the antenna impedance is made to provide a matched antenna impedance for maximum power transfer between the receiver circuitry 202 and the antenna 104.

In an implementation, an output impedance of the receiver circuitry 202 may include a fixed impedance of about 50 ohms. In this implementation, one or more parameters of the antenna 104 may be optimally adjusted to obtain a particular load impedance that is matched to the 50 ohms out impedance. For example, the optimal adjustment of the physical configuration of the antenna itself and its feed-line may provide the particular load impedance. In this example, the antenna tuning may involve adjustment of the antenna parameters to implement antenna impedance matching.

The following examples pertain to further embodiments:

Example 1 is a method of tuning in a receiver portable device comprising: measuring a local oscillator (LO) leakage power produced by at least one LO in the receiver portable device; measuring an antenna impedance based upon the measured LO leakage power; determining an antenna tuning based upon the measured antenna impedance; and tuning the antenna in response to detecting an out-of-tune antenna.

In example 2, the method as recited in example 1, wherein the LO leakage power includes a pre-defined value.

In example 3, the method as recited example 2, further comprising obtaining the pre-defined value by adjusting in-phase signal component (I) and quadrature signal component (Q) branches of the receiver portable device, or adjusting one or more parameters in a receiver circuitry of the receiver portable device.

In example 4, the method as recited example 2, wherein the pre-defined value is within a specification limit of a receiver circuitry, the specification limit includes a configured maximum adjustment of in-phase signal component (I) and a quadrature signal component (Q) of a received radio frequency (RF) signal.

In example 5, the method as recited example 1, wherein measuring the antenna impedance includes measuring a forward power level and a reflected power level based upon the measured LO leakage power.

In example 6, the method as recited example 1, wherein tuning the antenna includes optimally adjusting one or more antenna parameters of the antenna.

In example 7, the method as recited example 1, wherein tuning the antenna includes adjusting the antenna impedance to obtain the antenna impedance that matches an output impedance of the receiver.

In example 8, the method as recited any of examples 1 to 7, wherein measuring the antenna impedance and determining the antenna tuning are performed after every time period.

In example 9, the method as recited any of examples 1 to 7, wherein measuring the antenna impedance is performed during an inactive state of a receiver circuitry of the receiver portable device.

Example 10 is a portable device comprising: at least one local oscillator (LO) that produces a LO leakage power; a tuner circuitry configured to measure an antenna impedance based on the LO leakage power, wherein the tuner circuitry facilitates an antenna tuning based on the measured antenna impedance; and an impedance controller coupled to the tuner circuitry, the impedance controller is configured to change the antenna impedance after the antenna tuning.

In example 11, the portable device as recited in example 10, wherein the tuner circuitry is configured to control the at least one LO to provide at least one LO leakage power by adjusting or balancing an in-phase signal component (I) and a quadrature signal component (Q) branches of the portable device.

In example 12, the portable device as recited in example 10, wherein the tuner circuitry is configured to measure the antenna impedance by measuring a forward power level and a reflected power level.

In example 13, portable device as recited in any of examples 10 to 12, wherein the tuner circuitry is configured to perform the antenna tuning after every time period.

In example 14, portable device as recited in any of examples 10 to 12 further comprising an antenna, wherein the antenna tuning includes an optimal adjustment of one or more antenna parameters of the antenna.

In example 15, The portable device as recited in example 14, wherein the impedance controller is configured to match an impedance of the antenna with an output impedance of a receiver circuitry.

Example 16 is a method of tuning in a receiver portable device comprising: measuring an antenna impedance based upon a pre-defined value of a local oscillator (LO) leakage power; determining an antenna tuning based upon the measured antenna impedance; and tuning an antenna in response to detecting an out-of-tune antenna, wherein tuning the antenna includes matching an impedance of the antenna with an output impedance of a receiver circuitry.

In example 17, the method as recited in example 16, wherein the pre-defined value is obtained by an adjustment of in-phase signal component (I) and quadrature signal component (Q) branches of the receiver portable device.

In example 18, the method as recited in example 16, wherein the pre-defined value is within a specification limit of a receiver circuitry, the specification limit includes a configured maximum adjustment of in-phase signal component (I) and a quadrature signal component (Q) of a received radio frequency (RF) signal.

In example 19, the method as recited in example 16, wherein measuring the antenna impedance includes measuring a forward power level and a reflected power level based upon the pre-defined value.

In example 20, the method as recited in any of examples 16 to 19, wherein the LO leakage power is produced by at least one LO in the receiver portable device.

What is claimed is:

1. A method of tuning in a receiver portable device comprising:
   determining a local oscillator (LO) leakage power produced by at least one LO in a receiver circuitry of the receiver portable device, wherein the determining the LO leakage power includes measuring the LO leakage power produced by at least one LO in the receiver circuitry of the receiver portable device; measuring an antenna impedance based upon the determined LO leakage power, wherein antenna impedance is impedance of a receiver antenna of the receiver circuitry; determining that the receiver antenna is out of tune based upon the measured antenna impedance; and tuning the receiver antenna in response to determining that the receiver antenna is out of tune.

2. The method as recited in claim 1, wherein the determining the LO leakage power includes obtaining a pre-defined value of the LO leakage power.

3. The method as recited in claim 2, wherein the obtaining includes adjusting in-phase signal component (I) and quadrature signal component (Q) branches of the receiver portable device, or adjusting one or more parameters in the receiver circuitry of the receiver portable device.

4. The method as recited in claim 2, wherein the pre-defined value is within a specification limit of the receiver circuitry, the specification limit includes a configured maximum adjustment of in-phase signal component (I) and a quadrature signal component (Q) of a received radio frequency (RF) signal.

5. The method as recited in claim 1, wherein measuring the antenna impedance includes measuring a forward power level and a reflected power level based upon the determined LO leakage power.

6. The method as recited in claim 1, wherein measuring the antenna impedance is performed during an inactive state of the receiver circuitry of the receiver portable device.

7. The method as recited in claim 1, wherein the determining of the LO leakage power, the measuring the antenna impedance, and the tuning of the receiver antenna are performed independently of a transmission antenna.

8. The method as recited in claim 1, wherein tuning the receiver antenna includes adjusting the antenna impedance to obtain the antenna impedance that matches an output impedance of the receiver circuitry.

9. A portable device comprising:
a receiver circuitry that includes: a receiver antenna; at least one local oscillator (LO) that produces a LO leakage power in the receiver circuitry; a tuner circuitry configured to: determine the LO leakage power in the receiver circuitry; measure an antenna impedance based on the determined LO leakage power by measuring the antenna impedance by measuring a forward power level and a reflected power level, wherein the antenna impedance is an impedance of the receiver antenna of the receiver circuitry; determine that the receiver antenna is out of tune based upon the measured antenna impedance; and an impedance controller coupled to the tuner circuitry, the impedance controller is configured to change the antenna impedance in response to determining that the receiver antenna is out of tune.

10. The portable device as recited in claim 9, wherein the tuner circuitry is configured to control the at least one LO to provide at least one LO leakage power by adjusting or balancing an in-phase signal component (I) and a quadrature signal component (Q) branches of the portable device.

11. The portable device as recited in claim 9, wherein the tuner circuitry is configured to perform the determination of the LO leakage power includes a measurement the LO leakage power produced by at least one LO in the receiver circuitry.

12. The portable device as recited in claim 9 further comprising an antenna, wherein the antenna tuning includes an optimal adjustment of one or more antenna parameters of the antenna.

13. The portable device as recited in claim 12, wherein the impedance controller is configured to match an impedance of the antenna with an output impedance of the receiver circuitry.

14. A method of tuning in a receiver portable device comprising: measuring an antenna impedance based upon a pre-defined value of a local oscillator (LO) leakage power, wherein measuring the antenna impedance includes measuring a forward power level and a reflected power level based upon the pre-defined value; determining an antenna tuning based upon the measured antenna impedance; and tuning an antenna in response to detecting an out-of-tune antenna, wherein tuning the antenna includes matching an impedance of the antenna with an output impedance of a receiver circuitry.

15. The method as recited in claim 14, wherein the LO leakage power is produced by at least one LO in the receiver portable device.

16. The method as recited in claim 14, wherein the pre-defined value is obtained by an adjustment of in-phase signal component (I) and quadrature signal component (Q) branches of the receiver portable device.

17. The method as recited in claim 14, wherein the pre-defined value is within a specification limit of a receiver circuitry, the specification limit includes a configured maximum adjustment of in-phase signal component (I) and a quadrature signal component (Q) of a received radio frequency (RF) signal.

* * * * *